United States Patent
Kubala et al.

(10) Patent No.: US 10,235,310 B2
(45) Date of Patent: Mar. 19, 2019

(54) DEALLOCATION OF MEMORY BUFFER IN MULTIPROCESSOR SYSTEMS

(71) Applicant: INTERNATIONAL BUSINESS MACHINES CORPORATION, Armonk, NY (US)

(72) Inventors: Jeffrey P. Kubala, Poughquag, NY (US); Jerry A. Moody, Beekman, NY (US); Muruganandam Somasundaram, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/363,507

(22) Filed: Nov. 29, 2016

(65) Prior Publication Data

US 2018/0150417 A1 May 31, 2018

(51) Int. Cl.
*G06F 13/16* (2006.01)
*G06F 5/06* (2006.01)

(52) U.S. Cl.
CPC .......... *G06F 13/1673* (2013.01); *G06F 5/065* (2013.01); *G06F 2205/067* (2013.01)

(58) Field of Classification Search
CPC ....... H04L 49/90; H04L 47/10; G06F 3/0656; G06F 5/10; G06F 5/065
USPC .......................................................... 710/56
See application file for complete search history.

(56) References Cited

U.S. PATENT DOCUMENTS

| 6,182,089 | B1 * | 1/2001 | Ganapathy | ............ G06F 12/023 |
| 6,640,290 | B1 | 10/2003 | Forin et al. | |
| 6,732,124 | B1 * | 5/2004 | Koseki | ................ G06F 11/1435 |
| 6,757,803 | B1 * | 6/2004 | Lin | ........................ G06F 9/5016 711/152 |
| 6,772,310 | B2 | 8/2004 | Thompson et al. | |
| 7,549,090 | B2 | 6/2009 | Bailey et al. | |
| 7,908,454 | B2 | 3/2011 | Leung et al. | |
| 8,352,691 | B2 * | 1/2013 | Grusy | ................. G06F 12/0804 707/704 |
| 9,697,219 | B1 * | 7/2017 | Wang | ................. G06F 17/30144 |
| 2004/0139284 | A1 | 7/2004 | Clayton et al. | |
| 2004/0230713 | A1 | 11/2004 | Brice, Jr. et al. | |
| 2008/0263238 | A1 | 10/2008 | Brice et al. | |
| 2011/0320670 | A1 | 12/2011 | Bayer et al. | |

(Continued)

OTHER PUBLICATIONS

IBM "zEnterprise BC12" System Overview SA22-1089-00 Level 00b, Jan. 21, 2014, pp. 1-196.

(Continued)

*Primary Examiner* — Brian T Misiura
(74) *Attorney, Agent, or Firm* — Cantor Colburn LLP; Steven Chiu

(57) ABSTRACT

Described herein are technical features for freeing a buffer used during execution of a work-item by a multiprocessor. An example method includes identifying a first processing unit that assigned the buffer to the work-item, in response to a request from a second processing unit to free the buffer. The computer-implemented method also includes identifying a bitmap associated with the buffer, the bitmap being in a local memory of the first processing unit. The computer-implemented method also includes updating a bit from the bitmap to indicate that the buffer has been freed, the bit corresponding to the buffer.

17 Claims, 6 Drawing Sheets

(56) References Cited

U.S. PATENT DOCUMENTS

| | | |
|---|---|---|
| 2013/0061009 A1 | 3/2013 | Kumar et al. |
| 2014/0053064 A1* | 2/2014 | Weber .................. G06F 17/2247 |
| | | 715/235 |
| 2017/0199820 A1 | 7/2017 | Romanovskiy |
| 2018/0150223 A1* | 5/2018 | Kubala .................. G06F 3/0604 |
| 2018/0150416 A1* | 5/2018 | Kubala ............... G06F 13/1673 |

OTHER PUBLICATIONS

Jeffrey P. Kubala, et al., Pending U.S. Appl. No. 15/362,908 Entitled "Pre-Allocating Memory Buffers by Physical Processor and Using a Bitmap Metada in a Control Program" Filed with the USPTO Nov. 29, 2016.

Jeffrey P. Kubala, et al., Pending U.S. Appl. No. 15/429,271 Entitled "Pre-Allocating Memory Buffers by Physical Processor and Using a Bitmap Metada in a Control Program" Filed with the USPTO Feb. 10, 2017.

List of IBM Patents or Patent Applications Treated as Related (Appendix P), Filed May 16, 2018, 2 pages.

* cited by examiner

DEALLOCATION OF MEMORY BUFFER IN MULTIPROCESSOR SYSTEMS

BACKGROUND

The present application relates to computer systems, and more specifically, to multiprocessor computer systems.

A multiprocessor computer system also referred to as a multiprocessor system, or simply a multiprocessor includes a collection of independent processing units, which can execute multiple instructions in parallel, substantially increasing processing speed. A group of processing units within the multiprocessor can be defined as a node or cluster where each processing unit of the node executes instructions of one or a few processes to enable efficient, parallel processing of those processes. Some advanced multiprocessors contain multiple nodes and assign processes to different nodes in the system to provide parallel processing of multiple processes.

SUMMARY

According to one or more embodiments, a computer-implemented method for freeing a buffer used during execution of a work-item by a multiprocessor includes identifying a first processing unit that assigned the buffer to the work-item, in response to a request from a second processing unit to free the buffer. The computer-implemented method also includes identifying a bitmap associated with the buffer, the bitmap being in a local memory of the first processing unit. The computer-implemented method also includes updating a bit from the bitmap to indicate that the buffer has been freed, the bit corresponding to the buffer.

According to one or more embodiments, a system for freeing a buffer used during execution of a work-item by a multiprocessor is described. The system includes a plurality of processing units. The system also includes a memory accessible by the plurality of processing units in the system. The system further includes a memory controller coupled with the plurality of processing units and the memory. The memory controller identifies a first processing unit that assigned the buffer to the work-item, in response to a request from a second processing unit to free the buffer. The memory controller also identifies a bitmap associated with the buffer, the bitmap being in a local memory of the first processing unit. The memory controller also updates a bit from the bitmap to indicate that the buffer has been freed, the bit corresponding to the buffer.

According to one or more embodiments, a computer program product for freeing a buffer used during execution of a work-item by a multiprocessor, includes a computer readable storage medium, that includes computer executable instructions to identify a first processing unit that assigned the buffer to the work-item, the identification in response to a request from a second processing unit to free the buffer. The computer program product also includes instructions to identify a bitmap associated with the buffer, the bitmap being in a local memory of the first processing unit. The computer program product also includes instructions to update a bit from the bitmap to indicate that the buffer has been freed, the bit corresponding to the buffer.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Described here are technical solutions for managing memory allocations and deallocations in multiprocessor systems. For example, the technical solutions facilitate a processing unit from the multiprocessor system to handle deallocation/return of a memory buffer returned by a different processor from the multiprocessor system. As such, the technical solutions are rooted in and/or tied to computer technology in order to overcome a problem specifically arising in the realm of computers, specifically multiprocessor systems.

Figure 1:
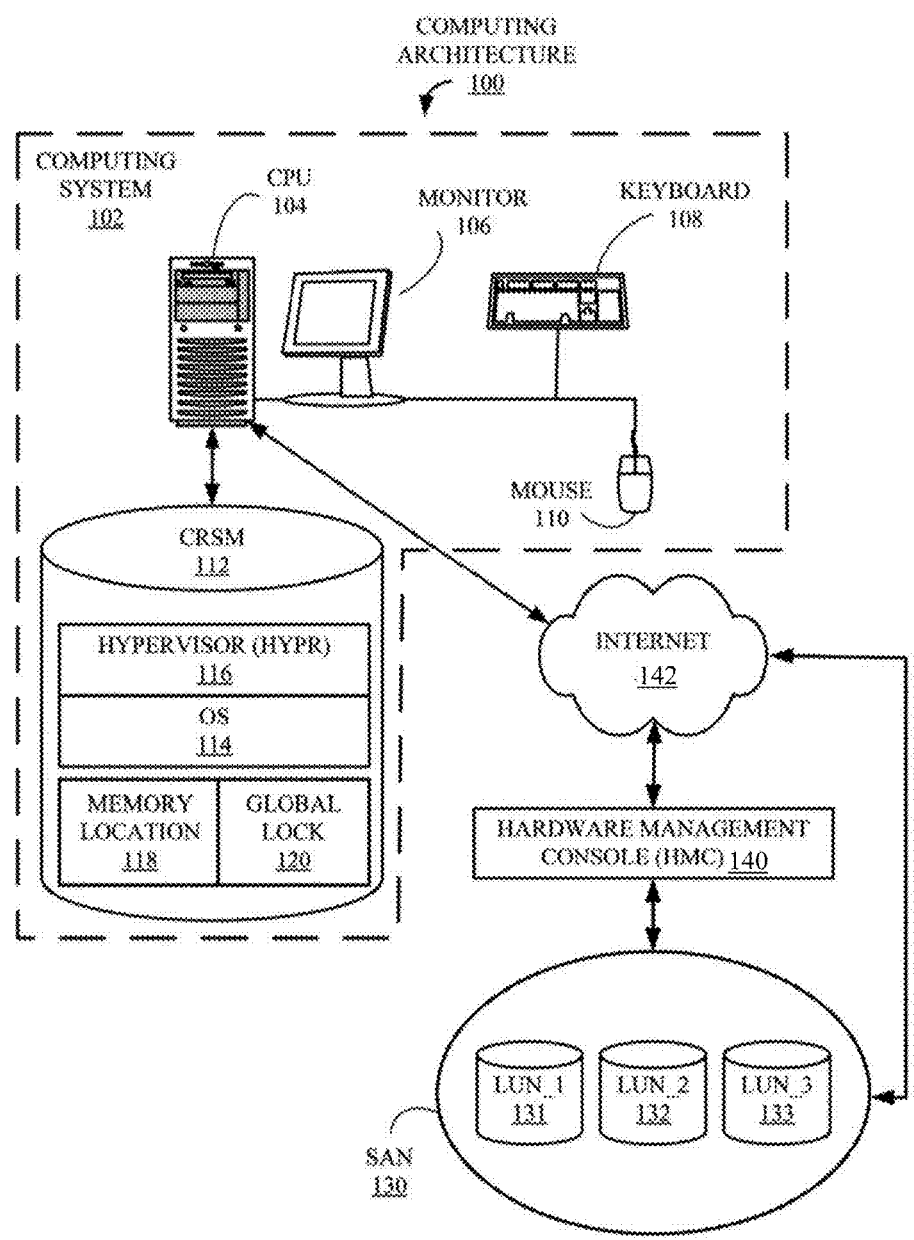
FIG. 1 is a computing architecture, according to one or more embodiments.

FIG. 1 is a computing architecture 100 on which the technical solutions described herein may be implemented. A computing system 102 includes a central processing unit (CPU) 104, coupled to a monitor 106, a keyboard 108 and a pointing device, or "mouse," 110, which together facilitate human interaction with components of computing system architecture 100 and computing system 102. Also included in computing system 102 and attached to CPU 104 is a computer-readable storage medium (CRSM) 112, which may be either dynamic or non-dynamic memory and incorporated into computing system 102 i.e. an internal device, or attached externally to CPU 104 by means of various, commonly available connection devices such as but not limited to, a universal serial bus (USB) port (not shown). CRSM 112 is illustrated storing an operating system (OS) 114, a hypervisor (HYPR) 116, a memory location 118 and a global lock 120, associated with memory location 118 and implemented in accordance with the disclosed technology.

Computing system 102 is connected to the Internet 142, which is also connected to a hardware management console (HMC) 140. Although in this example, computing system 102 and HMC 140 are communicatively coupled via the internet 142, they could also be coupled through any number of communication mediums such as, but not limited to, a local area network (LAN) and a wide area network (WAN). The HMC 140 enables an administrator to configure and control the various elements of computing architecture 100, including, but not limited to, computing system 102, HYPR 116 and a storage area network (SAN) 130. SAN 130 is illustrated as containing three storage devices, or logical units, i.e. a LUN-1 131, a LUN-2 132 and a LUN-3 133. It should be noted there are many possible computing system configurations, of which computing system architecture 100 is only one simple example employed herein as an example of one system that may implement the technical solutions described herein.

Figure 2:
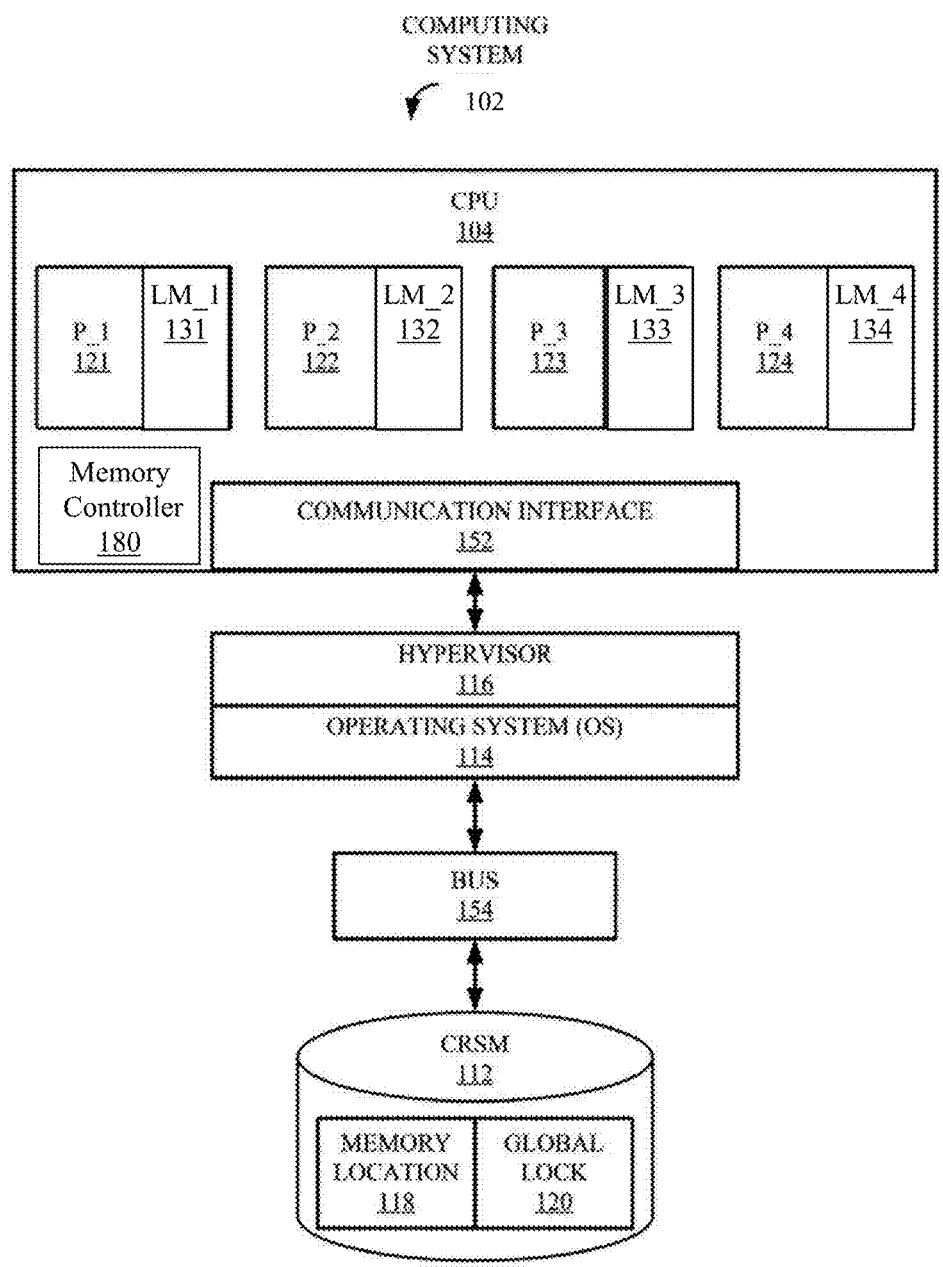
FIG. 2 is a block diagram showing elements of a multiprocessor system, according to one or more embodiments.

FIG. 2 is a block diagram showing elements of FIG. 1 in more detail. Included from FIG. 1 are CPU 104, CRSM 112, OS 114, HYPR 116, memory location 118 and global lock 120. Also illustrated are several processing units associated with the CPU 104, i.e. a processing unit 1, or "P-1," 121, a processing unit 2, or "P-2," 122, a processing unit 3, or "P-3," 123 and a processing unit 4, "P-4," 124. Each of the processing unit 121-124 is coupled to a local memory, i.e. a LM-1 131, a LM-2 132, a LM-3 133, and a LM-4 134, respectively. It should be noted that in other examples, the CPU 104 may include a different number of processing units than those in the example(s) herein.

Further, the CPU 104 includes a memory controller 180 that facilitates the processing units 121-124 to allocate and deallocate buffers from the CRSM 112. In one or more examples, the memory controller 180 further facilitates the processing units 121-124 to assign and remove/free one or more pre-allocated buffers from the CRSM 112 for use for a work-item. Accordingly, the memory controller 180 receives commands/instructions from one or more of the processing units 121-124 to assign and remove/free a pre-allocated buffer from a work-item. Further, the memory controller 180 receives one or more commands/instructions from the processing units 121-124 to allocate (that is reserve) and deallocate a buffer in the CRSM 112.

A communication interface 152 handles communication between CPU 104 and both OS 114 and HYPR 116. A communication bus 154 provides a path for signals to be transmitted among CPU 104, processing units 121-124, communication interface 152, OS 114, HYPR 116 and CRSM 112.

Figure 3:
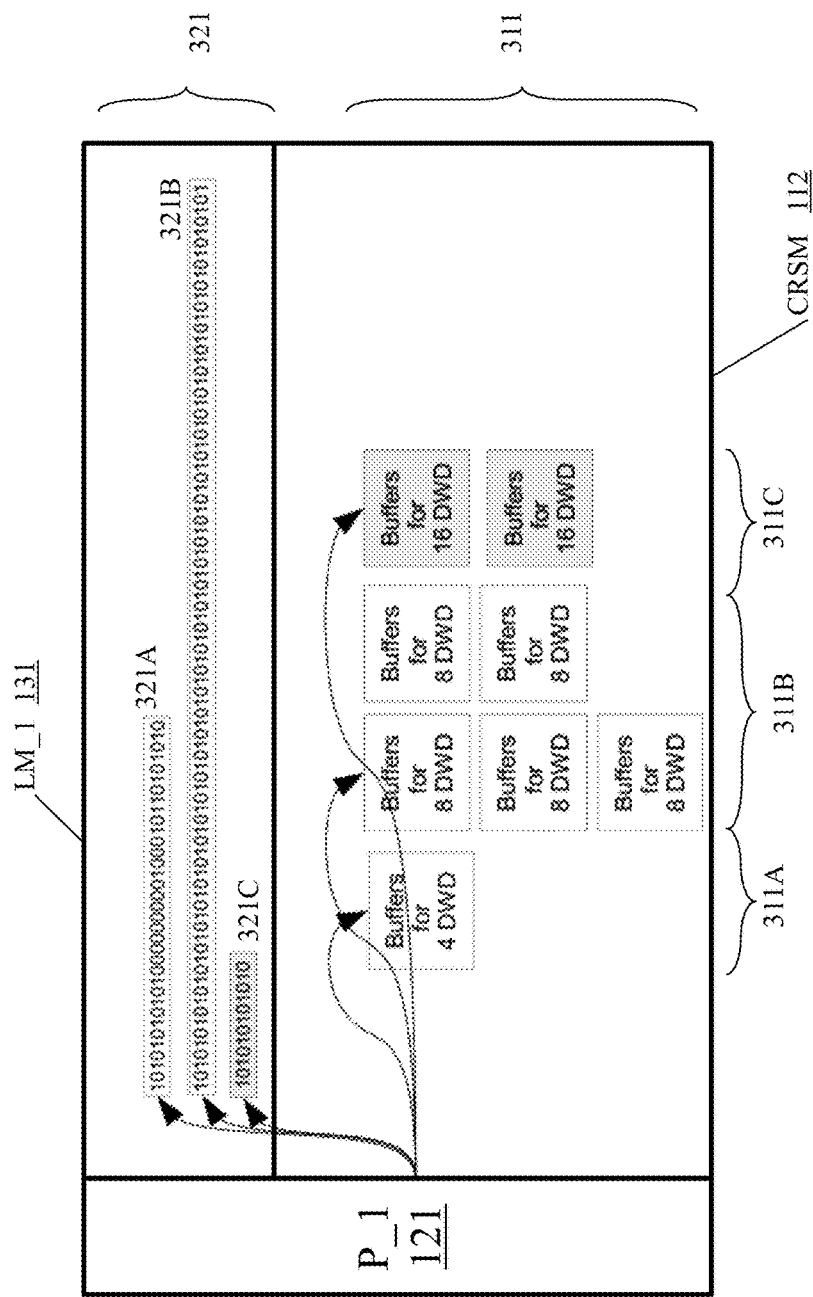
FIG. 3 illustrates a memory management scheme used by processing units of a multiprocessor system, according to one or more embodiments.

FIG. 3 illustrates a memory management scheme used by each processing unit 121-124. For illustration, P-1 121 is being used as an example.

As illustrated, the processing unit P-1 121 pre-allocates multiple sets of buffers 311 of predetermined sizes in the CRSM 112. For example, the P-1 121 pre-allocates the multiple sets of buffers 311 at startup. In one or more examples, P-1 121 pre-allocates a predetermined number of buffers of different types, where a type of a buffer is based on a specific size of the buffer. For example, in the illustrated scenario of FIG. 3, P-1 121 pre-allocates a first set of buffers 311A of 4 double words (DWD) each, a second set of buffers 311B of 8 DWD each, and a third set of buffers 311V of 16 DWD each. It should be noted that in other examples, the P-1 121 may pre-allocate buffers of different sizes than those in the above example scenario.

Further, P-1 121 uses a set of bitmaps 321 in the local memory 131 to maintain metadata corresponding to the sets of buffers 311. In one or more examples, P-1 121 maintains a set of bitmaps 321 for each respective set of buffers 311A-311C. For example, the set of bitmaps 321 includes multiple bitmaps 321A-321C respectively corresponding to the different types of buffers 311A-311C. Each of the bitmaps 321A-321B includes a bit corresponding to a specific buffer from the corresponding set of buffers 311A-311C. For example, a first bitmap 321A includes a bit corresponding to each respective buffer from the first set of buffers 311A. The bitmap 321B includes a bit corresponding to each respective buffer from the second set of buffers 311B. The bitmap 321C includes a bit corresponding to each respective buffer from the third set of buffers 311C. For example, when P-1 assigns a buffer from the set of buffers 311 for use, P-1 sets (or clears) the corresponding bit from the bitmaps 321, and when the buffer is freed/removed from use, the corresponding bit is cleared (or set).

Figure 4:
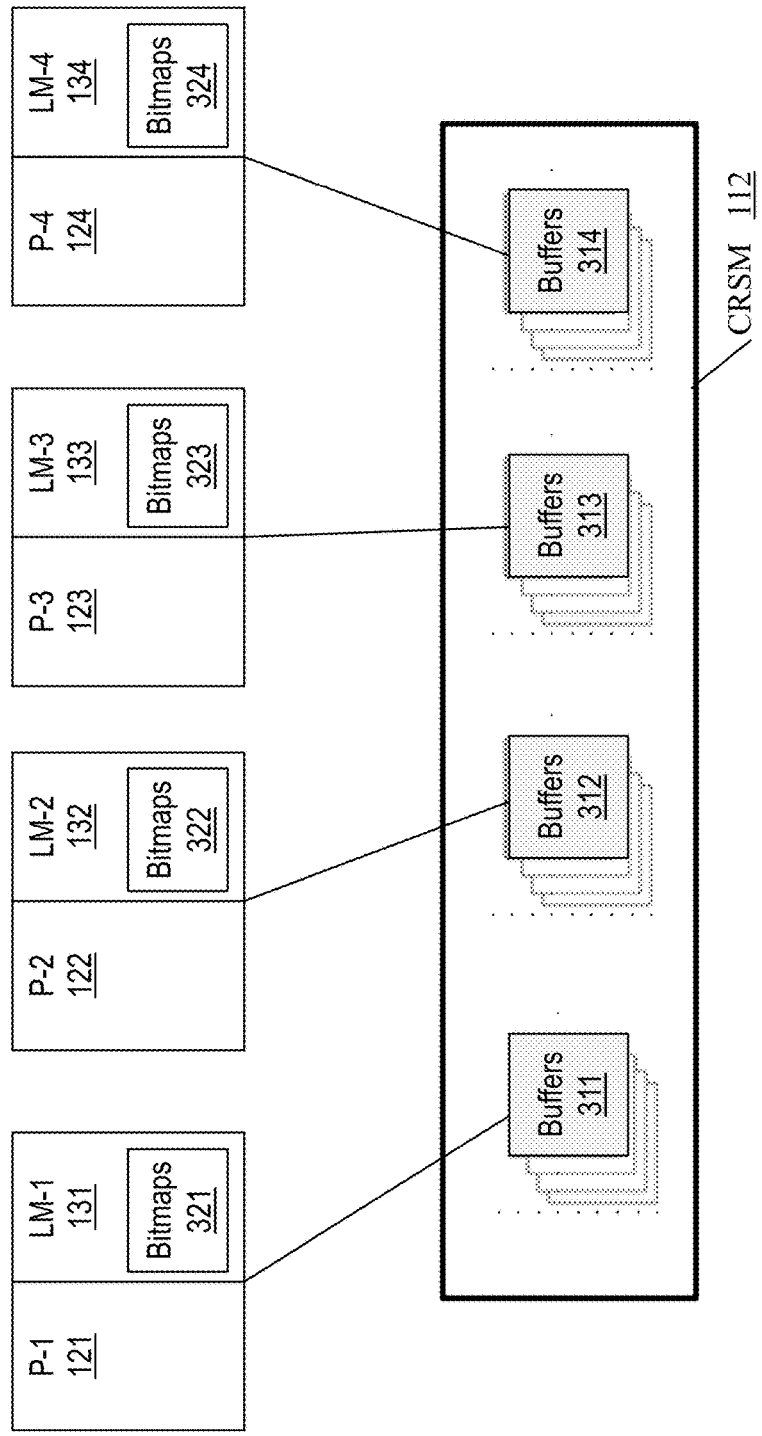
FIG. 4 illustrates pre-allocation of buffers in a memory by processing units of a multiprocessor system, according to one or more embodiments.

In one or more examples, each of the processing units 121-124 uses identical memory management scheme for pre-allocating local buffers in the respective local memory 131-134 and maintaining metadata in corresponding bitmaps. FIG. 4 illustrates that P-1 121 pre-allocates the buffers 311 in the CRSM 112 and maintains the corresponding metadata in the bitmaps 321 in the local memory 131. Similarly, P-2 122 pre-allocates buffers 312 in the CRSM 112 and maintains the corresponding metadata in bitmaps 322 in the local memory 132. Further, P-3 123 pre-allocates buffers 313 in the CRSM 112 and maintains the corresponding metadata in bitmaps 323 in the local memory 133. Further yet, P-4 124 pre-allocates buffers 314 in the CRSM 112 and maintains the corresponding metadata in bitmaps 324 in the local memory 134. The predetermined sizes of the buffers pre-allocated by each of the processing units 121-124 are identical. Moreover, each of the processing units 121-124 pre-allocates an identical number of buffers of each predetermined size. The processing units 121-124 pre-allocate the buffers 310 in the CRSM 112 by commanding the memory controller 180. Similarly, the processing units 121-124, further, assign and/or remove a buffer from a work-item by sending commands via the memory controller 180.

Alternatively, each of the processing units 121-124 pre-allocates a different number and/or sizes of buffers 311-314. Each of the processing units 121-124 keeps a data structure, such as a table, that indicates a number of sets of pre-allocated buffers, sizes of each buffer in each set of the pre-allocated buffers, and starting address of each set of pre-allocated buffers, among other information. The data structure is maintained in the respective local memory 131-134 of the processing units 121-124.

In one or more examples, the processing units 121-124 pre-allocate the respective buffers 311-314 in a predetermined sequence upon startup of the CPU 104. For example, P-1 pre-allocates the buffers 311, then P-2 pre-allocates the buffers 312, then P-3 pre-allocates the buffers 313, and then P-4 pre-allocates the buffers 314. Further, in one or more examples, each of the processing units 121-124 pre-allocate the corresponding buffers 311-314 at successive locations in the CRSM 112.

Further yet, each of the processing units 121-124 pre-allocates the predetermined number of buffers of each type in sequence within the respective sets of pre-allocated buffers 311-314. For example, referring back to the sets of buffers 311A-311C, P-1 121 pre-allocates N1 buffers of 4 DWD each, N2 buffers of 8 DWD each, and N3 buffers of 16 DWD each in that order. In one or more examples, P-1 121 keeps track of starting addresses of each set of buffers 311A-311C. Accordingly, given a memory address within a range of memory addresses spanned by the buffers 311, a buffer containing the memory address can be identified.

In a hypervisor environment as illustrated in FIGS. 1 and 2, a first processing unit P-1 121 may assign a buffer for use for a work-item. Subsequently, a second processing unit (queuing asynchronous work) P-2 122 could free or remove the buffer from use for the work-item.

In one or more examples, the first processing unit P-1 uses the local memory 131 for storing the metadata bitmaps 321 for the buffers 311. Because the second processing unit P-2 122 frees the buffer, the first processing unit P-1 121 that allocated the buffer may not update the metadata bitmap 321 for the free operation. Thus, a technical problem arises regarding how to update the metadata bitmap 321 of a buffer that was allocated by the first processing unit 121 when freeing the buffer by a second processing unit 122. Typically, the second processing unit 122 only has information about the buffer such as the address of the buffer in the CRSM 112 and length of the buffer.

Figure 5:
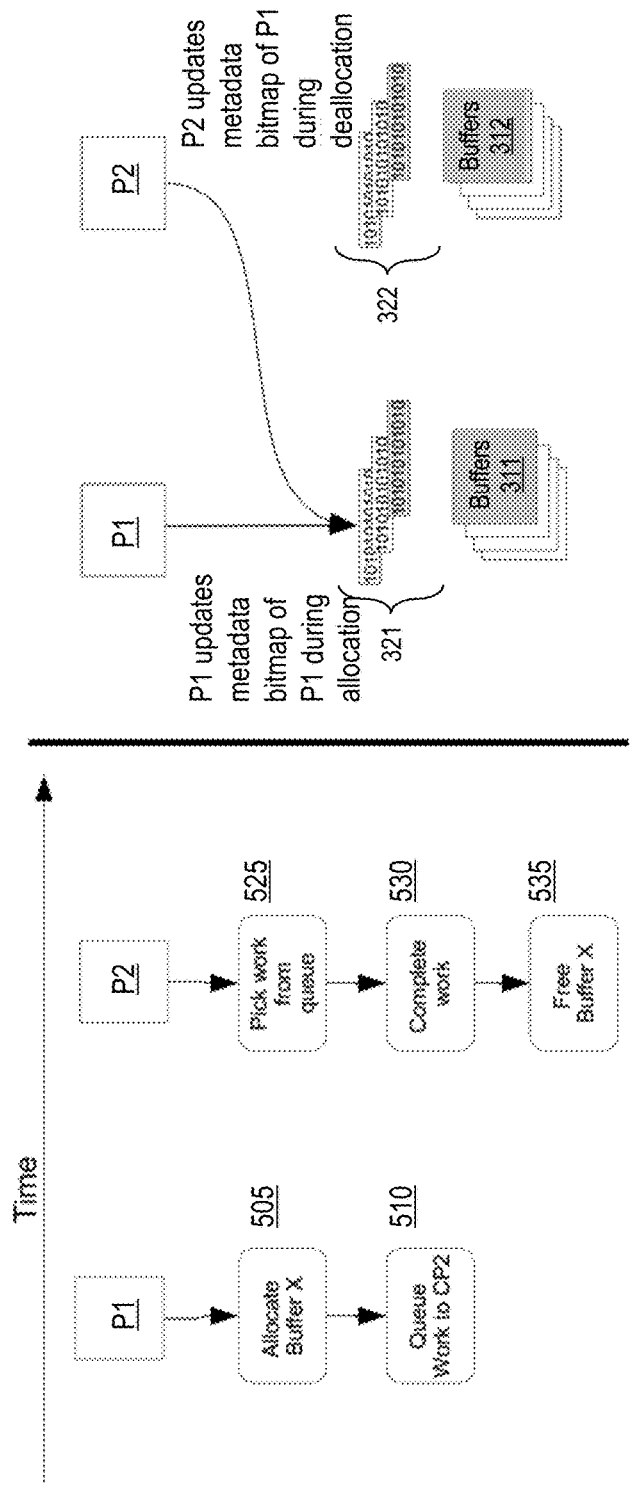
FIG. 5 illustrates an example scenario where a first processing unit assigns a buffer for a work-item and a second processing unit frees the buffer from the work-item, according to one or more embodiments.

For example, FIG. 5 illustrates the example scenario where P-1 121 allocates a buffer-X from the buffers 311 for a work-item, as shown at 505. The work-item is queued for the P-2 122 to take over, as shown at 510. Subsequently, when P-2 122 picks the work-item from the queue and completes the work-item, the P-2 122 frees the buffer-X from the local memory 131 (of P-1 121), as shown at 525, 530, and 535. In this case, P-1 121 updated the bitmaps 321 when buffer-X was allocated, and accordingly, when freeing the buffer-X after completing the work-item, the P-2 122 has to update the bitmaps 321 of P-1 121.

Figure 6:
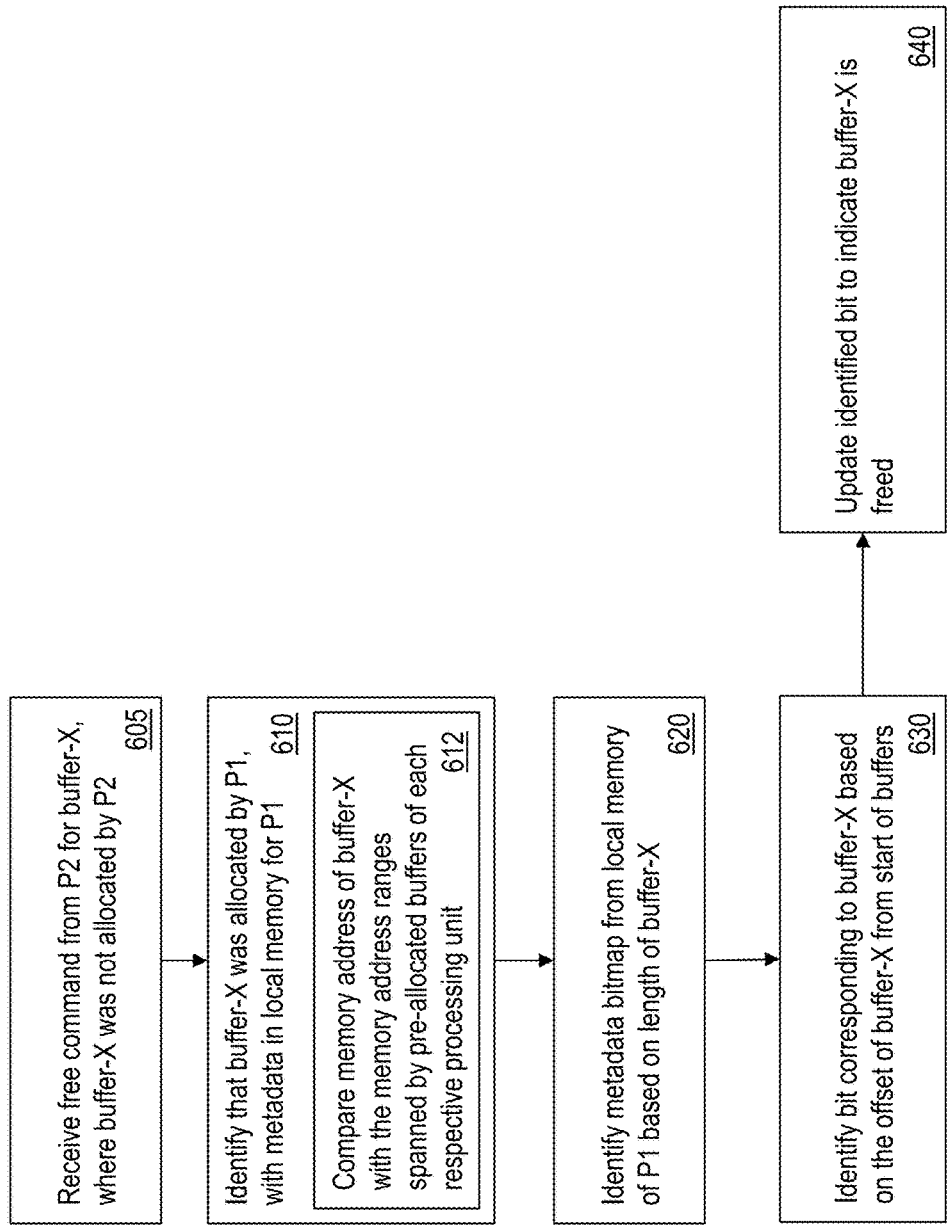
FIG. 6 illustrates a flowchart of an example method for freeing a buffer used during execution of a work-item by a multiprocessor, according to one or more embodiments.

FIG. 6 illustrates a flowchart of an example method for responding to a remove/free request for the buffer-X from P-2 122 when buffer-X was allocated by P-1 121. In one or more examples, the memory controller 180 implements the method. Alternatively, or in addition, the one or more processing units 121-124 may implement the method in conjunction with the memory controller 180.

For example, the memory controller 180 receives a free command from P-2 122 for buffer-X, as shown at 605. In one or more examples, the command specifies the memory address and length of the buffer-X that is to be deallocated. The memory controller 180 determines P-2 122, based on the memory address, did not allocate that buffer-X. Instead, as described herein, buffer-X may be allocated by any of the other processing units in the CPU 104 when operating on the work-item that P-2 122 is currently working on. Accordingly, P-2 122 does not include the metadata for buffer-X in the corresponding local memory 132.

Because the buffers 321-324 are allocated in series, based on the address of the buffer-X, predetermined allocations by each of the processing units 121-124, and a predetermined starting address for the buffers 320, the memory controller 180 (or P-2 122) identifies which of the processing unit 121-124 allocated the buffer-X, as shown at 610. For example, the memory controller 180 compares the memory address of buffer-X with the memory address ranges spanned by the pre-allocated buffers 311-314 of each respective processing unit of the CPU 104. Consider that the P-1 121 allocated buffer-X in this example scenario. It should be noted that in other examples, any of the other processing units in the CPU 104 may have allocated buffer-X.

The memory controller 180 further identifies the bitmap corresponding to buffer-X from the metadata bitmaps 321 that are stored in the local memory 131 of P-1 121, as shown at 620. The memory controller 180 identifies the bitmap based on the length/size of buffer-X, because the bitmaps 321 include different bitmaps for each predetermined size. For example, if buffer-X is 8 DWD in size, the memory controller 180 identifies the bitmap 321B from the bitmaps 321 that is associated with 8 DWD pre-allocated buffers (see FIG. 3). In other examples, buffer-X may be of a different size.

The memory controller 180 further identifies the bit corresponding to buffer-X in the identified bitmap, as shown at 630. For example, the bit is determined based on the memory address, starting address of the set of buffers, and the size of the buffer. For example, in the ongoing example scenario where buffer-X is 8 DWD from the set of buffers is 311B, the memory controller 180 identifies the bit as the Yth bit in the identified bitmap 321B by computing Y as Y=(memory address of buffer-X—starting address of buffers 311B)/(8 DWD). As described earlier, P-1 121 keeps track of the starting address of each set of buffers. In other examples, the memory controller 180 keeps track of the starting addresses. Alternatively, or in addition, the starting addresses may be computed dynamically based on the starting address of the buffers 311 (first address of the first buffer in the buffers 311). Alternatively, or in addition, the starting addresses may be predetermined.

Upon identifying the bit-Y in the bitmap, the memory controller 180 clears (or sets) the bit-Y to indicate that buffer-X has been freed from the work-item. Thus, the memory controller 180 identifies the bit-Y in the bitmap 321B associated with the set of buffers 311B of 8 DWD each in the P-1 121. Further, the memory controller 180 updates the bit-Y in response to a free/remove command from P-2 122 that is working on a work-item that P-1 121 was working on when P-1 assigned buffer-X to the work-item. In one or more examples, the bit-Y is updated atomically.

It should be noted that in other examples the processing unit P-2 122 implements the operations of the method described herein instead of the memory controller 180. It should further be noted that in other examples, the processing units involved in the operations may be different than P-1 121 and P-2 122, and the size of the buffer-X may be different than the example used for illustrative purposes herein.

Thus, the technical solutions described herein facilitate a multiprocessor, in response to a command to free a buffer from a first processing unit, identify a processing unit within the multiprocessor to which the buffer belongs and compute a position of a bit in metadata that is associated with the buffer. The multiprocessor can then update the metadata of the identified processing unit atomically to indicate that the buffer has been freed. The technical solutions, thus, facilitate multiple processing units to assign and free buffers to a work-item and queue the work-item for execution by any of the processing units in the multiprocessor without any overhead of memory transfers when a processing unit takes over the execution of the work-item from another processing unit.

The technical solutions, thus facilitate improving memory management in multiprocessor systems, and particularly those used in a hypervisor environment, where a buffer may be assigned for a work-item by a first processing unit and freed from the work-item by a second processing unit.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments described herein.

What is claimed is:

1. A computer implemented method freeing a buffer used during execution of a work-item by a multiprocessor, the method comprising:
    identifying a first processing unit that assigned the buffer to the work-item, the identification in response to a request from a second processing unit to free the buffer, wherein the first processing unit is identified based on a memory address of the buffer;
    identifying a bitmap associated with the buffer, the bitmap being in a local memory of the first processing unit; and
    updating a bit from the bitmap to indicate that the buffer has been freed, the bit corresponding to the buffer.

2. The computer implemented method of claim 1, further comprising identifying the bit from the bitmap.

3. The computer implemented method of claim 1, wherein the buffer is from a set of pre-allocated buffers that are pre-allocated by the first processing unit in memory accessible by the first processing unit and the second processing unit.

4. The computer implemented method of claim 1, wherein the bitmap associated with the buffer is identified based on a size of the buffer.

5. The computer implemented method of claim 4, wherein the bit from the bitmap is identified based on a number of pre-allocated buffers of the size of the buffer that are pre-allocated by the first processing unit.

6. The computer implemented method of claim 5, wherein the request from the second processing unit to free the buffer includes the memory address of the buffer and the size of the buffer.

7. A system for freeing a buffer used during execution of a work-item by a multiprocessor, the system comprising:
    a plurality of processing units;
    a memory accessible by the plurality of processing units in the system; and
    a memory controller coupled with the plurality of processing units and the memory, wherein the memory controller is configured to:
        identify a first processing unit that assigned the buffer to the work-item, the identification in response to a request from a second processing unit to free the buffer, wherein the first processing unit is identified based on a memory address of the buffer;
        identify a bitmap associated with the buffer, the bitmap being in a local memory of the first processing unit; and
        update a bit from the bitmap to indicate that the buffer has been freed, the bit corresponding to the buffer.

8. The system of claim 7, wherein the memory controller is further configured to identify the bit from the bitmap.

9. The system of claim 7, wherein the buffer is from a set of pre-allocated buffers that are pre-allocated by the first processing unit in memory accessible by the first processing unit and the second processing unit.

10. The system of claim 7, wherein the bitmap associated with the buffer is identified based on a size of the buffer.

11. The system of claim 10, wherein the bit from the bitmap is identified based on a number of pre-allocated buffers of the size of the buffer that are pre-allocated by the first processing unit.

12. The system of claim 11, wherein the request from the second processing unit to free the buffer includes the memory address of the buffer and the size of the buffer.

13. A computer program product for freeing a buffer used during execution of a work-item by a multiprocessor, the computer program product comprising a computer readable storage medium, the computer readable storage medium comprising computer executable instructions, wherein the computer readable storage medium comprises instructions to:
    identify a first processing unit that assigned the buffer to the work-item, the identification in response to a request from a second processing unit to free the buffer, wherein the first processing unit is identified based on a memory address of the buffer;
    identify a bitmap associated with the buffer, the bitmap being in a local memory of the first processing unit; and
    update a bit from the bitmap to indicate that the buffer has been freed, the bit corresponding to the buffer.

14. The computer program product of claim 13, wherein the buffer is from a set of pre-allocated buffers that are pre-allocated by the first processing unit in memory accessible by the first processing unit and the second processing unit.

15. The computer program product of claim 13, wherein the bitmap associated with the buffer is identified based on a size of the buffer.

16. The computer program product of claim 15, wherein the bit from the bitmap is identified based on a number of pre-allocated buffers of the size of the buffer that are pre-allocated by the first processing unit.

17. The computer program product of claim 16, wherein the request from the second processing unit to free the buffer includes the memory address of the buffer and the size of the buffer.

* * * * *